United States Patent
Tanemura et al.

(10) Patent No.: US 10,614,228 B2
(45) Date of Patent: Apr. 7, 2020

(54) OBJECT WITH COMMUNICATION INTERFACE AND COMPUTER-READABLE MEDIUM STORING COMMUNICATION PROGRAM

(71) Applicant: SHARP KABUSHIKI KAISHA, Sakai, Osaka (JP)

(72) Inventors: Yoshitaka Tanemura, Sakai (JP); Yohichiroh Tatsuki, Sakai (JP); Masayuki Naitoh, Sakai (JP); Tomoyuki Kawasoe, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/745,810

(22) PCT Filed: Jul. 13, 2016

(86) PCT No.: PCT/JP2016/070675
§ 371 (c)(1),
(2) Date: Jan. 18, 2018

(87) PCT Pub. No.: WO2017/014125
PCT Pub. Date: Jan. 26, 2017

(65) Prior Publication Data
US 2018/0211048 A1    Jul. 26, 2018

(30) Foreign Application Priority Data
Jul. 23, 2015  (JP) .................................. 2015-146041

(51) Int. Cl.
*G06F 21/60* (2013.01)
*H04B 1/59* (2006.01)
(Continued)

(52) U.S. Cl.
CPC ............ *G06F 21/60* (2013.01); *G06F 21/606* (2013.01); *G06K 19/073* (2013.01);
(Continued)

(58) Field of Classification Search
CPC ......................... G06F 21/60; G06F 2221/2143
See application file for complete search history.

(56) References Cited

U.S. PATENT DOCUMENTS

| | | | |
|---|---|---|---|
| 2006/0026340 A1* | 2/2006 | Ito | G11C 5/04 711/103 |
| 2010/0090000 A1 | 4/2010 | Varone et al. | |

(Continued)

FOREIGN PATENT DOCUMENTS

| | | |
|---|---|---|
| DE | 102004046845 A1 | 3/2006 |
| JP | 2006-309331 A | 11/2006 |

OTHER PUBLICATIONS

"ETSI TS 102 223 V9.0.0 (Oct. 2009) Technical Specification: Smart Cards; Card Application Toolkit (CAT) (Release 9)", 208 pages (Year: 2009).*

*Primary Examiner* — Thaddeus J Plecha
(74) *Attorney, Agent, or Firm* — ScienBiziP, P.C.

(57) ABSTRACT

An object includes: a first communication interface unit configured to communicate with a first apparatus; a second communication interface unit configured to communicate with a second apparatus; and a control unit configured to perform control to transmit second information based on first information received from the first apparatus via the first communication interface unit to the second apparatus via the second communication interface unit, and, in a case that communication with the first apparatus via the first communication interface unit ends, perform control to transmit request information for requesting deletion of the second information transmitted to the second apparatus to the second apparatus.

5 Claims, 4 Drawing Sheets

(51) Int. Cl.
     *G06K 19/073*     (2006.01)
     *G06K 19/077*     (2006.01)
     *H04L 29/06*     (2006.01)
     *G06K 19/07*     (2006.01)
     *H04L 9/32*     (2006.01)

(52) U.S. Cl.
     CPC ....... *G06K 19/077* (2013.01); *G06K 19/0723* (2013.01); *G06K 19/07743* (2013.01); *H04B 1/59* (2013.01); *H04L 63/02* (2013.01); *G06F 2221/2143* (2013.01); *H04L 9/3263* (2013.01)

(56) References Cited

U.S. PATENT DOCUMENTS

| | | | |
|---|---|---|---|
| 2011/0151900 A1 | 6/2011 | Yu et al. | |
| 2012/0159152 A1* | 6/2012 | Ha | H04L 63/06 713/155 |
| 2013/0226791 A1* | 8/2013 | Springer | G06Q 20/353 705/41 |
| 2014/0291392 A1* | 10/2014 | Teuwen | G06Q 20/367 235/380 |
| 2015/0208463 A1* | 7/2015 | Yang | H04W 48/16 370/329 |
| 2016/0006901 A1* | 1/2016 | Torigoshi | H04N 1/32545 358/1.15 |
| 2016/0088115 A1* | 3/2016 | Agnew | H04L 67/2842 709/206 |
| 2016/0156696 A1* | 6/2016 | Liddicott | H04L 67/2833 709/203 |

\* cited by examiner

OBJECT WITH COMMUNICATION INTERFACE AND COMPUTER-READABLE MEDIUM STORING COMMUNICATION PROGRAM

TECHNICAL FIELD

The present invention relates to an object and a communication program.

This application claims priority based on Japanese Patent Application No. 2015-146041 filed in Japan on Jul. 23, 2015, the entire content of which is incorporated herein by reference.

BACKGROUND ART

Patent Document 1 describes a technology related to an IC card which includes a contact type communication interface (contact communication interface) and a non-contact type communication interface (non-contact communication interface) and is capable of simultaneously communicating with two apparatuses using the respective communication interfaces. This IC card determines whether a command is received from the contact communication interface or from the non-contact communication interface, and generates a response message in accordance with a communication interface. For example, the IC card can generate two public key certificates (response messages). A first public key certificate is transmitted using the contact communication interface and is used in a relatively narrow range. On the other hand, a second public key certificate is transmitted using the non-contact communication interface which causes less damage when the certificate is misused.

PRIOR ART DOCUMENT

Patent Document

[Patent Document 1]
Japanese Unexamined Patent Application, First Publication No. 2006-309331

SUMMARY OF THE INVENTION

Problem to be Solved by the Invention

With the IC card technology described in Patent Document 1, in the case of an object which is capable of simultaneous communication with two apparatuses using two communication interfaces, transmitting information of one apparatus received via one communication interface to the other apparatus via the other communication interface can be considered. In this case, after communication with the one communication interface ends, the information of the one apparatus may remain in the other apparatus. It is not preferable in terms of security for the information to remain in the other apparatus indefinitely.

Several aspects of the present invention are made in view of the above points, and an object of the present invention is to provide an object and a communication program which reduce a possibility of information delivered from one apparatus to another apparatus being misused when communication with a plurality of apparatuses using a plurality of communication interfaces is possible.

Means for Solving the Problems

Some aspects of the present invention have been made to solve the above-described problem, and a first aspect of the present invention is an object including: a first communication interface unit configured to communicate with a first apparatus; a second communication interface unit configured to communicate with a second apparatus; and a control unit configured to perform control to transmit second information based on first information received from the first apparatus via the first communication interface unit to the second apparatus via the second communication interface unit, and, in a case that communication with the first apparatus via the first communication interface unit ends, perform control to transmit request information for requesting deletion of the second information transmitted to the second apparatus to the second apparatus.

In addition, a second aspect of the present invention is a communication program which causes a computer to execute: transmitting second information based on first information received from a first apparatus via a first communication interface unit to a second apparatus via a second communication interface unit; and transmitting request information for requesting deletion of the second information transmitted to the second apparatus to the second apparatus in a case that communication with the first apparatus via the first communication interface unit ends.

Effect of the Invention

According to some aspects of the present invention, it is possible to reduce a possibility of information delivered from one apparatus to another apparatus being misused when communication with a plurality of apparatuses using a plurality of communication interfaces is possible.

EMBODIMENTS FOR CARRYING OUT THE INVENTION

Hereinafter, embodiments of the present invention will be described in detail with reference to the drawings.

First Embodiment

First, a first embodiment of the present invention will be described.

Figure 1:
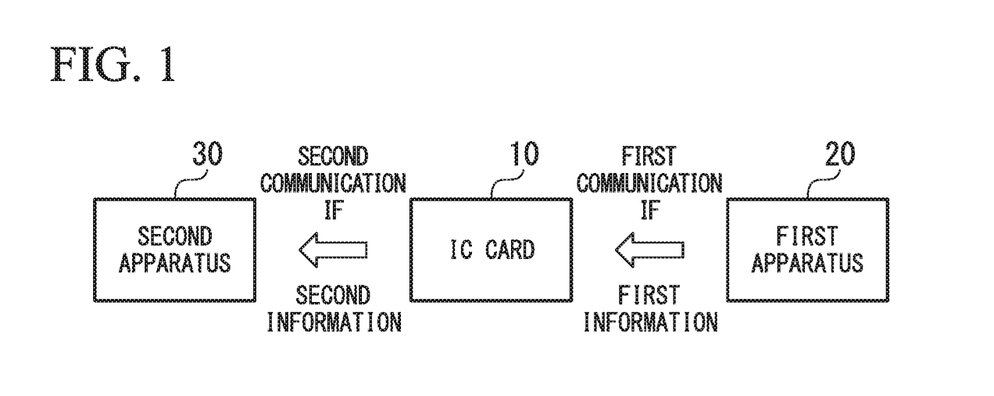
FIG. 1 is an explanatory diagram for describing an outline of a first embodiment of the present invention.

FIG. 1 is an explanatory diagram for describing an outline of the present embodiment. An illustrated IC card 10 is an integrated circuit (IC) card (an example of an object) which is capable of simultaneously communicating with two apparatuses including a first apparatus 20 and a second apparatus 30 using a first communication interface (a first communication IF) and a second communication interface (a second communication IF), respectively, in parallel. For example, the IC card 10 can output information of the first apparatus 20 received from the first apparatus 20 via the first communication interface to the second apparatus 30 via the second communication interface. In this case, even after communication with the first communication interface ends, the information of the first apparatus 20 may remain in the second apparatus 30 in some cases. It is not preferable in terms of security for the information to remain in the other apparatus indefinitely. Therefore, the IC card 10 according to the present embodiment transmits request information for requesting deletion of the information of the first apparatus 20 transmitted to the second apparatus 30 to the second apparatus 30 when the communication with the first apparatus 20 via the first communication interface ends. As a result, the IC card 10 can prevent the information of the first apparatus 20 from remaining in the second apparatus 30 and reduce a possibility of information of the first apparatus 20 being misused.

Figure 2:
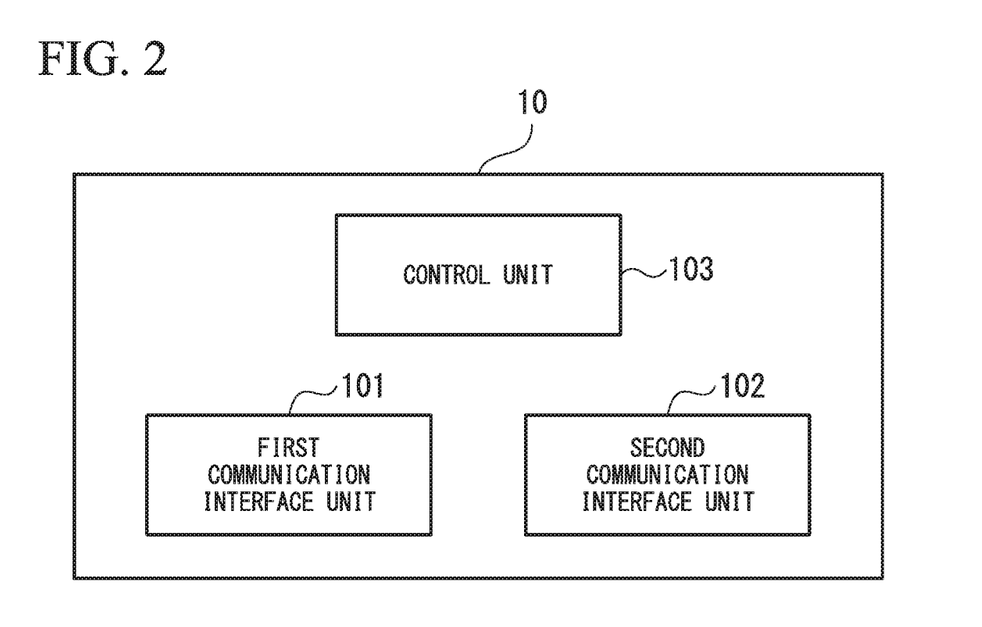
FIG. 2 is a block diagram which shows a functional configuration of an IC card according to the first embodiment.

FIG. 2 is a block diagram which shows a functional configuration of the IC card 10 according to the present embodiment.

The IC card 10 includes a first communication interface unit 101, a second communication interface unit 102, and a control unit 103. The first communication interface unit 101 communicates with an apparatus (for example, the first apparatus 20) via the first communication interface. The second communication interface unit 102 communicates with an apparatus (for example, the second apparatus 30) which is different from a communication destination of the first communication interface via the second communication interface.

For example, the first communication interface is a non-contact communication interface for communicating with the first apparatus 20 in a non-contact manner. On the other hand, the second communication interface is a contact communication interface for connecting and communicating with the second apparatus 30 through contact therewith.

The first communication interface and the second communication interface may both be contact communication interfaces or may both be non-contact communication interfaces.

The control unit 103 controls the first communication interface unit 101 and the second communication interface unit 102, converts a command or information received via one communication interface into a command or information suitable for the other communication interface, and transmits the command or information via the other communication interface. For example, the control unit 103 acquires information (hereinafter referred to as "first information") received from the first apparatus 20 via the first communication interface unit 101. In addition, the control unit 103 performs control to transmit information (hereinafter, referred to as "second information") based on the first information acquired from the first apparatus 20 to the second apparatus 30 via the second communication interface unit 102.

In addition, the control unit 103 performs control to transmit request information for requesting deletion of the second information transmitted to the second apparatus 30 to the second apparatus 30 via the second communication interface unit 102 when communication with the first apparatus 20 via the first communication interface unit 101 ends.

The second information may be information including at least a part of the first information or information corresponding to the first information. In addition, the second information may be the first information itself, or may be information obtained by protocol-converting the first information received by a communication specification of the first communication interface into the communication specification of the second communication interface.

Next, a communication method using the IC card 10 according to the present embodiment will be described.

Figure 3:
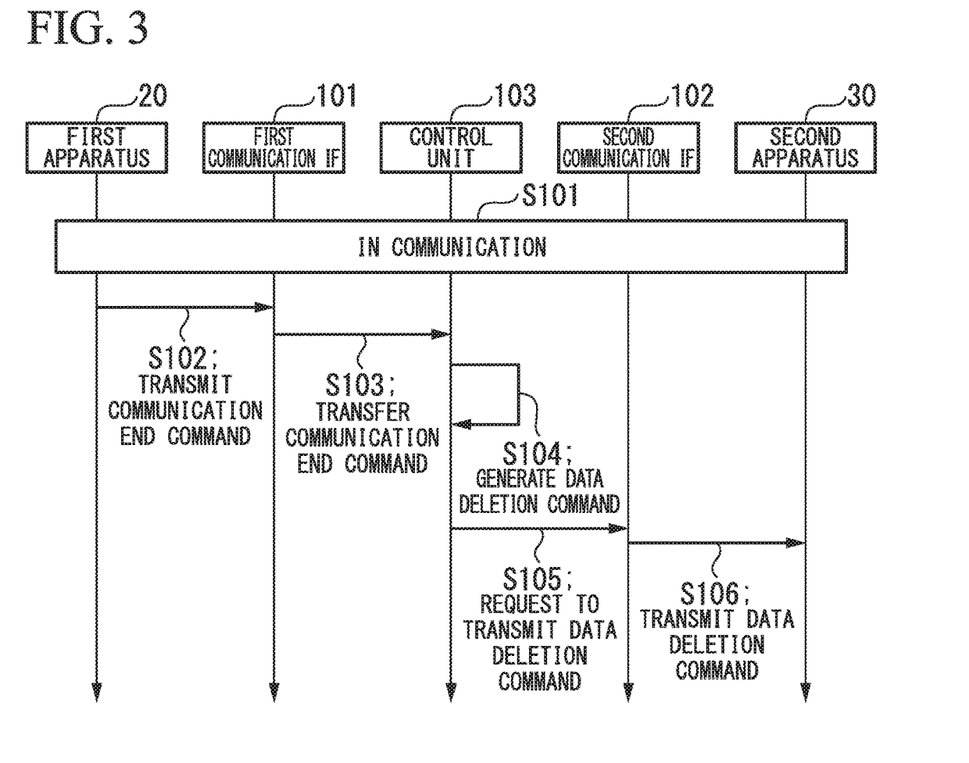
FIG. 3 is a sequence diagram which shows an example of communication processing in the IC card according to the first embodiment.

FIG. 3 is a sequence diagram which shows an example of communication processing in the IC card 10 according to the present embodiment.

(Step S101) The IC card 10 is in communication with the first apparatus 20 and the second apparatus 30 in parallel (simultaneously). Specifically, the control unit 103 is in communication with the first apparatus 20 and the second apparatus 30 in parallel via the first communication interface unit 101 and the second communication interface unit 102, respectively. For example, the control unit 103 acquires first information from the first apparatus 20 via the first communication interface unit 101, and transmits second information based on the acquired first information to the second apparatus 30 via the second communication interface unit 102.

(Step S102) The first apparatus 20 transmits a communication end command indicating an end of communication to the IC card 10 when transmission of the first information ends.

(Step S103) When the communication end command transmitted from the first apparatus 20 is received, the first communication interface unit 101 of the IC card 10 transfers the received communication end command to the control unit 103.

(Step S104) When the communication end command is acquired from the first communication interface unit 101, the control unit 103 creates a data deletion command for deleting the second information transmitted to the second apparatus 30 as a command for the second communication interface.

(Step S105) Then, the control unit 103 requests the second communication interface unit 102 to transmit the created data deletion command.

(Step S106) The second communication interface unit 102 transmits the data deletion command to the second apparatus 30 in response to the request from the control unit 103.

Accordingly, the second apparatus 30 which receives the data deletion command deletes the second information acquired from the IC card 10.

As described above, the IC card 10 (an example of an object) according to the present embodiment includes the first communication interface unit 101 communicating with the first apparatus 20, the second communication interface unit 102 communicating with the second apparatus 30, and the control unit 103. The control unit 103 performs control to transmit the second information based on the first information received from the first apparatus 20 via the first communication interface unit 101 to the second apparatus 30 via the second communication interface unit 102. In addition, the control unit 103 performs control to transmit request information for requesting deletion of the second information transmitted to the second apparatus 30 to the second apparatus 30 when communication with the first apparatus 20 via the first communication interface unit 101 ends.

As a result, the IC card 10 can prevent the information of the first apparatus 20 from remaining in the second apparatus 30. Therefore, according to the present embodiment, when the IC card 10 can communicate with a plurality of apparatuses using a plurality of communication interfaces, it is possible to reduce a possibility of information delivered from one apparatus to another apparatus being misused.

For example, when information indicating an end of communication is received from the first apparatus 20 via the first communication interface unit 101, the control unit 103 performs control to transmit request information for requesting deletion of the second information transmitted to the second apparatus 30 to the second apparatus. Accordingly, the IC card 10 can prevent the information of the first apparatus 20 from remaining in the second apparatus 30 when an end of communication with the first apparatus 20 is detected.

Second Embodiment

Next, a second embodiment of the present invention will be described.

An IC card 10A in the present embodiment can simultaneously communicate with two apparatuses including a first apparatus 20 and a second apparatus 30 in parallel using a first communication interface and a second communication interface, respectively, in the same manner as in the first embodiment shown in FIG. 1. The present embodiment is an example in which the first communication interface, a non-contact communication interface, is defined as a wireless interface with a longer communication distance such as Wireless Fidelity (WiFi), Bluetooth (registered trademark), or ZigBee (registered trademark).

Figure 4:
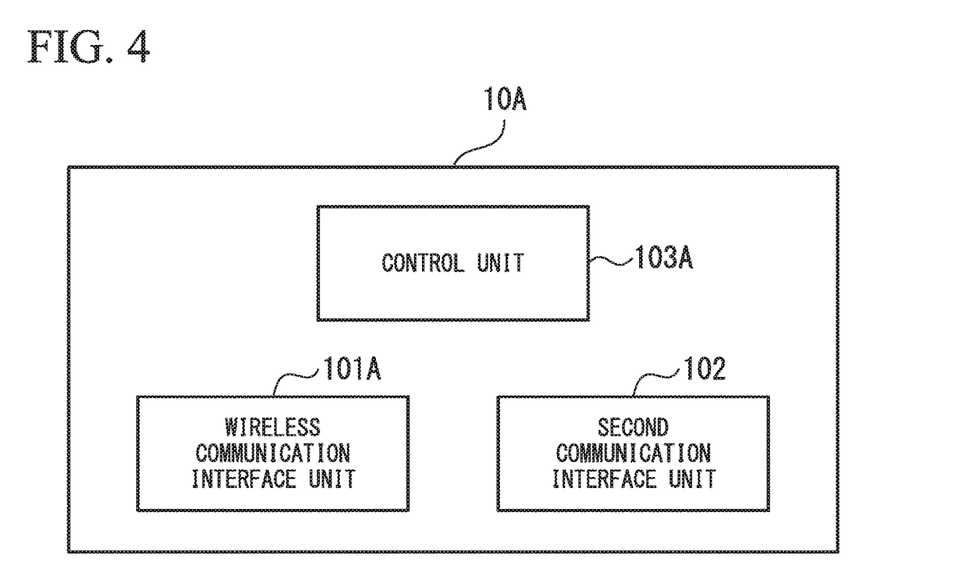
FIG. 4 is a block diagram which shows a functional configuration of an IC card according to a second embodiment of the present invention.

FIG. 4 is a block diagram which shows a functional configuration of the IC card 10A according to the present embodiment.

The IC card 10A includes a wireless communication interface unit 101A, a second communication interface unit 102, and a control unit 103A. The wireless communication interface unit 101A communicates with another apparatus (for example, the first apparatus 20) via the first communication interface (wireless interface). The second communication interface unit 102 communicates with another apparatus (for example, the second apparatus 30) via the second communication interface in the same manner as the second communication interface unit 102 of the first embodiment.

The control unit 103A acquires first information received from the first apparatus 20 via the wireless communication interface unit 101A. In addition, the control unit 103A performs control to transmit second information based on the first information acquired from the first apparatus 20 to the second apparatus 30 via the second communication interface unit 102.

Moreover, when the wireless communication interface unit 101A detects disconnection of communication with the first apparatus 20, the control unit 103A performs control to transmit request information for requesting deletion of the second information transmitted to the second apparatus 20 to the second apparatus 30 via the second communication interface unit 102.

Next, a communication method by the IC card 10A according to the present embodiment will be described.

Figure 5:
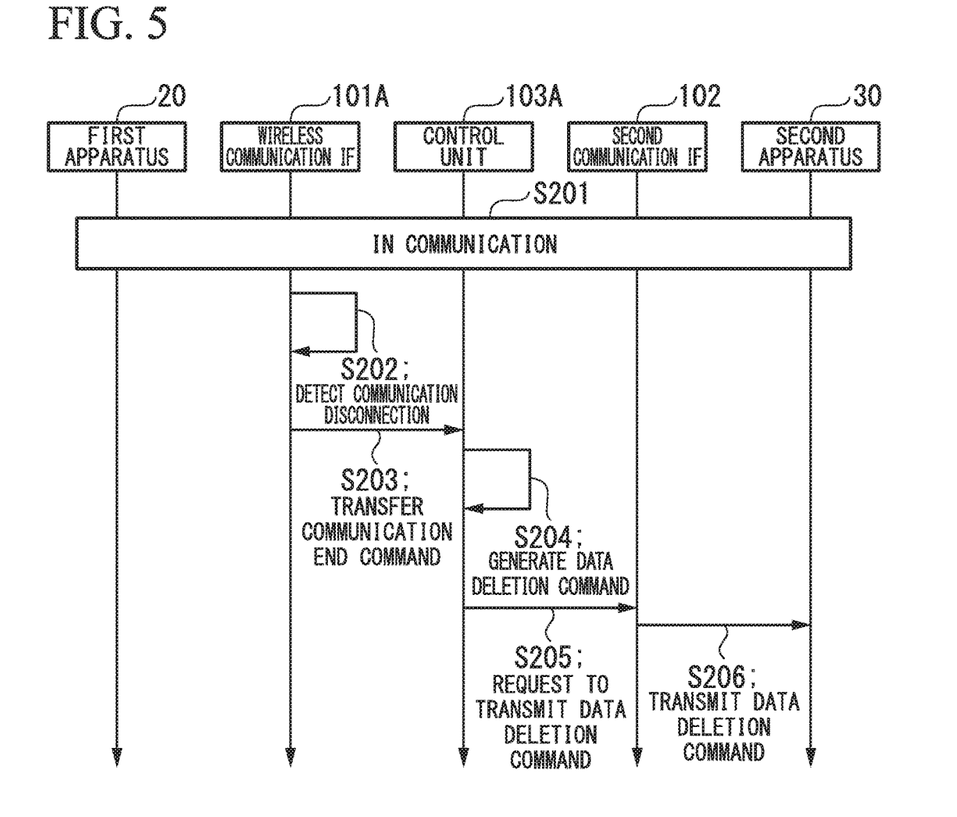
FIG. 5 is a sequence diagram which shows an example of communication processing in the IC card according to the second embodiment.

FIG. 5 is a sequence diagram which shows an example of communication processing in the IC card 10A according to the present embodiment.

(Step S201) The IC card 10A is in communication with the first apparatus 20 and the second apparatus 30 in parallel (simultaneously). Specifically, the control unit 103a is in communication with the first apparatus 20 and the second apparatus 30 in parallel via the wireless communication interface unit 101A and the second communication interface unit 102, respectively. For example, the control unit 103A acquires first information from the first apparatus 20 via the wireless communication interface unit 101A, and transmits second information based on the acquired first information to the second apparatus 30 via the second communication interface unit 102.

(Step S202) The wireless communication interface unit 101A monitors a state of communication with the first apparatus 20, and detects communication disconnection when the communication is disconnected.

(Step S203) The wireless communication interface unit 101A transmits a communication end command to the control unit 103A when communication disconnection is detected.

(Step S204) The control unit 103a generates a data deletion command for deleting the second information transmitted to the second apparatus 30 as a command for the second communication interface when the communication end command is acquired from the wireless communication interface unit 101A.

(Step S205) Then, the control unit 103A requests the second communication interface unit 102 to transmit the generated data deletion command.

(Step S206) The second communication interface unit 102 transmits the data deletion command to the second apparatus 30 in response to the request from the control unit 103A.

As a result, the second apparatus 30 which receives the data deletion command deletes the second information acquired from the IC card 10A.

As described above, the IC card 10A (an example of an object) according to the present embodiment includes the wireless communication interface unit 101A (another example of the first communication interface unit) communicating with the first apparatus 20, the second communication interface unit 102 communicating with the second apparatus 30, and the control unit 103A. The control unit 103A performs control to transmit the second information based on the first information received from the first apparatus 20 via the wireless communication interface unit 101A to the second apparatus 30 via the second communication interface unit 102. In addition, when communicating with the first apparatus 20 via the wireless communication interface unit 101A ends, the control unit 103A performs control to transmit request information for requesting deletion of the second information transmitted to the second apparatus 30 to the second apparatus 30.

Specifically, when the wireless communication interface unit 101A detects disconnection of the communication with the first apparatus 20, the control unit 103A performs control to transmit request information for requesting deletion of the second information transmitted to the second apparatus 30 to the second apparatus 30.

As a result, the IC card 10A can prevent the information of the first apparatus 20 from remaining in the second apparatus 30 even when the communication with the first apparatus 20 is disconnected and the communication ends. Therefore, according to the present embodiment, when the IC card 10A can communicate with a plurality of apparatuses using a plurality of communication interfaces, it is possible to reduce a possibility of information delivered from one apparatus to the other apparatus being misused.

Third Embodiment

Next, a third embodiment of the present embodiment will be described.

An IC card 10B in the present embodiment can simultaneously communicate with two apparatuses including a first apparatus 20 and a second apparatus 30 in parallel using a first communication interface and a second communication interface, respectively, in the same manner as in the first embodiment shown in FIG. 1. The present embodiment is an example in which the first communication interface is defined as a wireless interface in the same manner as in the second embodiment and the second communication interface is defined as a contact communication interface for dealing with a proactive command.

A proactive command is a command in a card application toolkit (CAT) defined by the European Telecommunications Standards Institute (ETSI) TS 102 223, and is a command for performing various operation requests and information transmission from the IC card 10B to a cellular phone or a network server.

Figure 6:
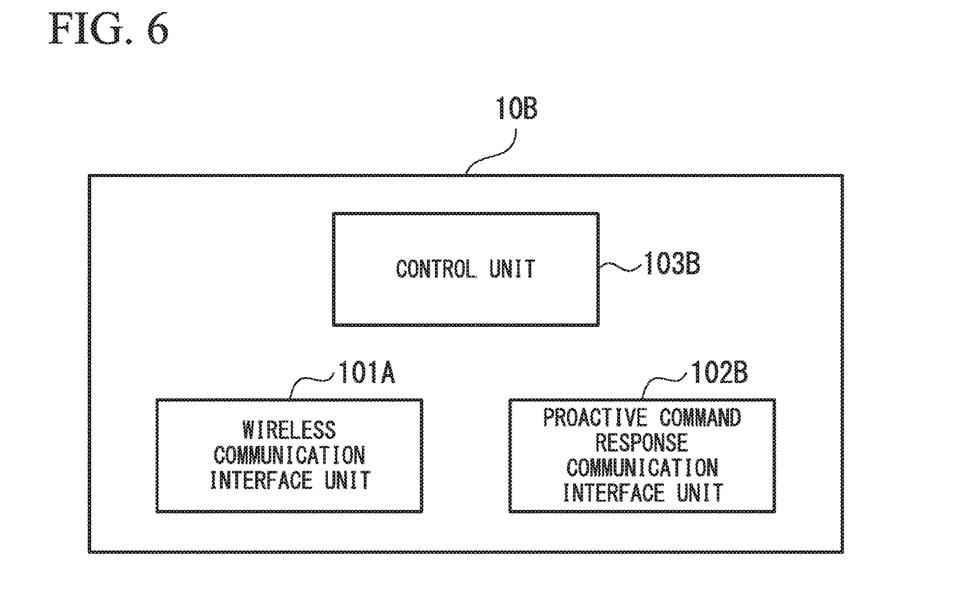
FIG. 6 is a block diagram which shows a functional configuration of an IC card according to a third embodiment of the present invention.

FIG. 6 is a block diagram which shows a functional configuration of the IC card 10B according to the present embodiment.

The IC card 10B includes a wireless communication interface unit 101A, a proactive command response communication interface unit 102B, and a control unit 103B. The wireless communication interface unit 101A communicates with another apparatus (for example, the first apparatus 20) via a first communication interface (wireless interface) in the same manner as the wireless communication interface unit 101A of the second embodiment. The proactive command response communication interface unit 102B communicates with another apparatus (for example, the second apparatus 30) via a second communication interface.

The control unit 103B acquires first information received from the first apparatus 20 via the wireless communication interface unit 101A. In addition, the control unit 103B performs control to transmit second information based on the first information acquired from the first apparatus 20 to the second apparatus 30 via the proactive command response communication interface unit 102B.

Moreover, when the wireless communication interface unit 103B detects disconnection of communication with the first apparatus 20, the control unit 103B performs control to transmit a refresh (UICC Reset) command defined as a proactive command to the second apparatus 30 via the proactive command response communication interface unit 102B. The refresh (UICC Reset) command is a command for resetting a reset operation of the IC card 10B currently performed on the second apparatus 30 again.

Next, a communication method using the IC card 10B according to the present embodiment will be described.

Figure 7:
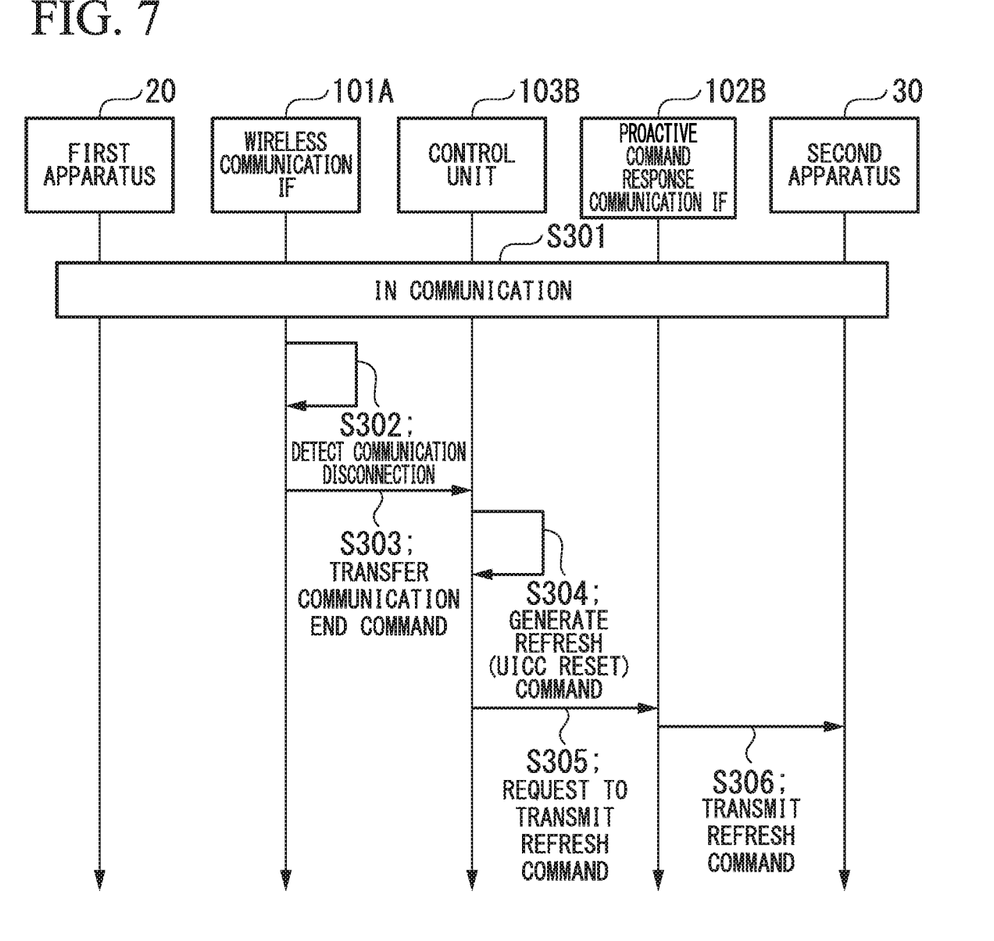
FIG. 7 is a sequence diagram which shows an example of communication processing in the IC card according to the third embodiment.

FIG. 7 is a sequence diagram which shows an example of communication processing in the IC card 10B according to the present embodiment.

(Step S301) The IC card 10B is in communication with the first apparatus 20 and the second apparatus 30 in parallel (simultaneously). Specifically, the control unit 103B is in communication with the first apparatus 20 and the second apparatus 30 in parallel via the wireless communication interface unit 101A and the proactive command response communication interface unit 102B, respectively. For example, the control unit 103 acquires first information from the first apparatus 20 via the wireless communication interface unit 101A, and transmits second information based on the acquired first information to the second apparatus 30 via the proactive command response communication interface unit 102B.

(Step S302) The wireless communication interface unit 101A monitors a state of communication with the first apparatus 20 and detects communication disconnection when the communication is disconnected.

(Step S303) The wireless communication interface unit 101A transmits a communication end command to the control unit 103B when communication disconnection is detected.

(Step S304) The control unit 103B generates a refresh (UICC Reset) command to be transmitted to the second apparatus 30 for the proactive command response communication interface when the communication end command is acquired from the wireless communication interface unit 101A.

(Step S305) Then, the control unit 103B requests the proactive command response communication interface unit 102B to transmit the generated refresh (UICC Reset) command.

(Step S306) The proactive command response communication interface unit 102B transmits the refresh (UICC Reset) command to the second apparatus 30 in response to the request from the control unit 103B.

As a result, in the second apparatus 30 which receives the refresh (UICC Reset) command, re-reading of data is performed and the second information acquired from the card 10B is deleted.

As described above, the IC card 10B according to the present embodiment (an example of an object) includes the wireless communication interface unit 101A (another example of the first communication interface unit) communicating with the first apparatus 20, the proactive command response communication interface unit 102B (another example of the second communication interface unit) communicating with the second apparatus 30, and the control unit 103B. The control unit 103B performs control to transmit the second information based on the first information received from the first apparatus 20 via the wireless communication interface unit 101A to the second apparatus 30 via the proactive command response communication interface unit 102B. In addition, when communicating with the first apparatus 20 via the wireless communication interface unit 101A ends, the control unit 103B performs control to transmit request information for requesting deletion of the second information transmitted to the second apparatus 30 to the second apparatus 30.

Specifically, when the wireless communication interface unit 101A detects disconnection of the communication with the first apparatus 20, the control unit 103A performs control to transmit request information for requesting deletion of the second information transmitted to the second apparatus 30 to the second apparatus 30.

As a result, the IC card 10B can prevent the information of the first apparatus 20 from remaining in the second apparatus 30 even when the communication with the first apparatus 20 is disconnected and the communication ends. Therefore, according to the present embodiment, when the IC card 10B can communicate with a plurality of apparatuses using a plurality of communication interfaces, it is possible to reduce a possibility of information delivered from one apparatus to another apparatus being misused.

A portion of the IC card 10 (10A, 10B), for example, the control unit 103 (103A, 103B), in the embodiments described above may be realized by a computer. In this case, this may also be realized by recording a program for realizing this control function in a computer-readable recording medium and causing a computer system to read and execute the program recorded in this recording medium. "Computer system" herein refers to a computer system embedded in the IC card 10 (10A, 10B) and includes hardware such as an OS and peripheral apparatuses. In addition, "computer-readable recording medium" herein refers to a portable medium such as a flexible disk, a magneto-optical disc, a ROM, or a CD-ROM, or a storage device such as a hard disk embedded in a computer system.

Furthermore, "computer-readable recording medium" may include a medium which dynamically holds a program for a short period of time like a communication line for transmitting a program via a network such as the Internet or a communication line such as a telephone line, and a medium which holds a program for a certain period of time like a volatile memory in a computer system serving as a server or a client in this case. In addition, the program may be a program for realizing some of the functions described above, and may also be a program which can realize the functions described above in combination with a program already recorded in a computer system.

Embodiments of the present invention have been described in detail with reference to the drawings, but specific configurations are not limited to those described above, and various design changes and the like can be made in a range not departing from the gist of the invention. For example, an example of simultaneously communicating with two apparatuses using two communication interfaces is described in the embodiments described above, but it is also possible to simultaneously communicate with three or more apparatuses using three or more communication interfaces.

(1) An object including a first communication interface unit configured to communicate with a first apparatus, a second communication interface unit configured to communicate with a second apparatus, and a control unit configured to perform control to transmit second information based on first information received from the first apparatus via the first communication interface unit to the second apparatus via the second communication interface unit, and, when communication with the first apparatus via the first communication interface unit ends, to perform control to transmit request information for requesting deletion of the second information transmitted to the second apparatus to the second apparatus.

(2) The object according to (1) in which, when information indicating a communication end is acquired from the first apparatus via the first communication interface unit, the control unit performs control to transmit the request information to the second apparatus.

(3) The object according to (1) in which, when the first communication interface unit detects a disconnection of the communication with the first apparatus, the control unit performs control to transmit the request information to the second apparatus.

(4) The object according to any one of (1) to (3) in which the control unit simultaneously performs both communication via the first communication interface unit and communication via the second communication interface unit.

(5) A communication program which causes a computer to execute steps, the steps including transmitting second information based on first information received from a first apparatus via a first communication interface unit to a second apparatus via a second communication interface unit, and transmitting request information for requesting deletion of the second information transmitted to the second apparatus to the second apparatus when communication with the first apparatus via the first communication interface unit ends.

INDUSTRIAL APPLICABILITY

Some aspects of the present invention can be applied to an object, a communication program, and the like in which a possibility of information delivered from one apparatus to another apparatus being misused needs to be reduced when communication with a plurality of apparatuses using a plurality of communication interfaces is possible.

DESCRIPTION OF THE REFERENCE SYMBOLS

10, 10A, 10B IC card
20 First apparatus
30 Second apparatus
101 First communication interface unit
101A Wireless communication interface unit
102 Second communication interface unit
102B Proactive command response communication interface unit
103, 103A, 103B Control unit

The invention claimed is:
1. An object comprising:
first communication interface circuitry configured to communicate with a first apparatus;
second communication interface circuitry configured to communicate with a second apparatus; and
control circuitry configured to
perform control to transmit second information based on first information received from the first apparatus via the first communication interface circuitry to the second apparatus via the second communication interface circuitry, and,
in a case that communication with the first apparatus via the first communication interface circuitry ends, perform control to transmit, to the second apparatus, request information for requesting deletion of the second information transmitted to the second apparatus to the second apparatus,
wherein the object is an integrated circuit card and the request information is a UICC Reset command.
2. The object according to claim 1,
wherein, in a case that information indicating a communication end is acquired from the first apparatus via the first communication interface circuitry, the control circuitry is configured to perform control to transmit the request information to the second apparatus.
3. The object according to claim 1,
wherein, in a case that the first communication interface circuitry detects disconnection of the communication with the first apparatus, the control circuitry is configured to perform control to transmit the request information to the second apparatus.
4. The object according to claim 1,
wherein the control circuitry is configured to simultaneously perform both communication via the first communication interface circuitry and communication via the second communication interface circuitry.
5. A non-transitory computer-readable medium which stores a communication program which causes a computer to execute:
transmitting second information based on first information received from a first apparatus via a first communication interface circuitry to a second apparatus via a second communication interface circuitry; and
transmitting, to the second apparatus, request information for requesting deletion of the second information transmitted to the second apparatus in a case that communication with the first apparatus via the first communication interface circuitry ends, wherein the computer is an integrated circuit card and the request information is a UICC Reset command.

* * * * *